(12) United States Patent
Worsham et al.

(10) Patent No.: US 6,446,420 B1
(45) Date of Patent: Sep. 10, 2002

(54) METHOD AND APPARATUS FOR SIMULTANEOUSLY TOPPING TOBACCO AND CONTROLLING SUCKERS WITH CHEMICALS APPLIED TO CUT STEMS BY MECHANICAL MEANS

(75) Inventors: Arch Douglas Worsham, Scottville; Thomas B. Burch, Wilkesboro, both of NC (US)

(73) Assignee: Burch Company, Wilkesboro, NC (US)

( * ) Notice: Subject to any disclaimer, the term of this patent is extended or adjusted under 35 U.S.C. 154(b) by 0 days.

(21) Appl. No.: 09/388,162

(22) Filed: Sep. 1, 1999

Related U.S. Application Data (63) Continuation-in-part of application No. 09/011,589, filed on Feb. 9, 1998, now Pat. No. 6,125,621.
(60) Provisional application No. 60/098,696, filed on Sep. 1, 1998, provisional application No. 60/007,633, filed on Nov. 28, 1995, and provisional application No. 60/002,397, filed on Aug. 17, 1995.

(51) Int. Cl.$^7$ ................................................ A01D 45/16
(52) U.S. Cl. ........................................ 56/27.5; 56/16.8
(58) Field of Search ............................. 56/16.8, 16.4 R, 56/14.7, 16.7, DIG. 5, 27.5, 295, 255; D93/214, 222.11, DIG. 6

(56) References Cited

U.S. PATENT DOCUMENTS

| | | | |
|---|---|---|---|
| 2,111,030 A | | 3/1938 | Mote ........................... 43/148 |
| 2,878,633 A | * | 3/1959 | Mullin ........................ 56/16.8 |
| 2,908,444 A | | 10/1959 | Mullin ........................ 239/223 |
| 2,939,636 A | | 6/1960 | Mullin ........................ 239/223 |
| 2,973,615 A | | 3/1961 | Yaremchuk ................. 56/25.4 |
| 3,462,927 A | | 8/1969 | Quick ............................ 56/56 |
| 3,596,447 A | | 8/1971 | Makeham ...................... 56/63 |
| 3,760,569 A | | 9/1973 | Willett ........................ 56/10.7 |
| 3,942,308 A | | 3/1976 | Vicendese ................... 56/16.8 |
| 4,926,622 A | * | 5/1990 | McKee ....................... 56/16.8 |
| 5,131,216 A | | 7/1992 | Otten ............................ 56/56 |
| 5,237,803 A | * | 8/1993 | Domingue, Jr. .............. 56/16.8 |
| 5,312,044 A | * | 5/1994 | Eaton ....................... 239/225.1 |
| 6,125,621 A | * | 10/2000 | Burch ........................ 56/16.8 |

OTHER PUBLICATIONS

Publication 1997 Flue–Cured Tobacco Information published by North Carolina Cooperative Extension Service Bulletin AS–187.

* cited by examiner

*Primary Examiner*—Robert E. Pezzuto
*Assistant Examiner*—Árpád Fábián Kovács
(74) *Attorney, Agent, or Firm*—Dougherty & Clements LLP (57) ABSTRACT

A method and apparatus for simultaneously cutting and directing fluid into the stem of a tabacco plant, the apparatus including having a liquid delivery blade, a source of fluid communicating with to the underside of the blade, an associated power source for rotating the liquid delivery blade at a sufficiently high speed "top" tobacco plants.

8 Claims, 9 Drawing Sheets

Prior Art

Fig. 3

Prior Art

METHOD AND APPARATUS FOR SIMULTANEOUSLY TOPPING TOBACCO AND CONTROLLING SUCKERS WITH CHEMICALS APPLIED TO CUT STEMS BY MECHANICAL MEANS

CROSS REFERENCE TO RELATED APPLICATIONS

Priority is claimed from co-pending continuation-in-part U.S. patent application Ser. No. 09/011,589, filed Feb. 9, 1998, now U.S. Pat. No. 6,125,621, which issued on Oct. 3, 2000, and which claims priority from Provisional Application 60/002,397 filed Aug. 17, 1995, Provisional Application 60/007,633 filed Nov. 23, 1995, Design Application No. 29/047,779 filed Dec. 12, 1995, now U.S. Pat. No. Des. 386, 190, and PCT Patent Application PCT/US96/13362 filed Aug. 16, 1996. This application also claims the benefit of U.S. Provisional Application No. 60/098,696, filed on Sep. 1, 1998.

FIELD OF THE INVENTION

The present invention relates to a method and apparatus for controlling the unwanted growth of auxiliary buds on plants. Such auxiliary buds are also referred to as "suckers." The present invention also relates to a method and apparatus for reducing maleic hydrazide residues in tobacco, reducing the "topping" operations that tobacco farmers need to execute in order to control tobacco suckers, reducing the exposure of tobacco laborers to chemicals, and reducing the amount of chemicals used in the tobacco industry.

BACKGROUND OF THE INVENTION

In order to obtain maximum yields of flue-cured and burley tobacco in the United States, the plants are "topped" by removing the flowers or flower buds before harvest. However, the removal of these flowers allows auxiliary buds or "suckers," to flourish. It is desirable to prevent the growth of suckers. Currently, such growth is inhibited by using a combination of "contact" and "systemic" plant growth regulator chemicals. Usually, at least two or three applications of this "contact" chemical are applied, followed by an application of the "systemic" chemical. Maleic hydrazide is the only strictly systemic plant growth regulator that is currently available. All of such chemicals are sprayed over the top of the tobacco plants. Some chemicals in the market are a combination of systemic and contact types. Over one half of the tobacco produced in the United States is "topped" mechanically by using high-clearance equipment with rotating cutter blades.

The problems associated with the known method and apparatus include: (1) necessary repeated applications of the plant growth regulator over the tobacco field; (2) high pesticide use; (3) worker exposure to pesticides; and (4) maleic hydrazide residues in the cured leaf. The latter problem is of utmost concern among growers, manufacturers, and exporters of tobacco. Maleic hydrazide is applied at 1.5 gallons product per acre (1.5 pounds active ingredient per gallon) in thirty to fifty gallons water per acre. Industry regulations imposes strictly held constraints pertaining to the maximum percentage amount of maleic hydrazide permissible in a cured tobacco leaf. Weather conditions, cultural practices, and improper use of maleic hydrazide often lead to residues unacceptable to domestic and foreign buyers.

DESCRIPTION OF THE RELATED ART

The following are U.S. Patents concerning agricultural cutting and chemical application devices:

| U.S. Pat. No. | Issue Date | Inventor | Title |
| --- | --- | --- | --- |
| 2,111,030 | 03-15-1938 | Mote | AGRICULTURAL MACHINE |
| 2,908,444 | 10-13-1959 | Mullin | ROTARY LAWN MOWER SPRAYING ATTACHMENT |
| 2,939,636 | 06-07-1960 | Mullin | SPRAYING ATTACHMENT FOR ROTARY LAWN-MOWER |
| 2,973,615 | 03-07-1961 | Yaremchuk | LAWN MOWER WITH WEED SPRAYER |
| 3,462,927 | 08-26-1969 | Quick | TOPPING MECHANISM FOR CANE HARVESTERS |
| 3,596,447 | 08-03-1971 | Makeham | CROP TOPPER |
| 3,760,569 | 09-25-1973 | Willett | SUGAR CANE TOPPER FOR V-CUTTER HARVESTER |
| 3,942,308 | 03-09-1976 | Vicendese | CHEMICAL DISPENSING LAWN MOWER ARRANGEMENT |
| 5,131,216 | 07-21-1992 | Otten | DEVICE FOR SEPARATING THE SHOOT TIPS OF SUGAR-CANE PLANTS |

Mote, U.S. Pat. No. 2,111,030, teaches a device for distributing chemicals for destroying insect pests which is also capable of harvesting crops of various habits of growth and various sizes.

Mullin, U.S. Pat. No. 2,908,444, teaches a spraying attachment device for rotary lawn mowers which can dispense liquid material to a confined and controlled area of the gardener's choosing.

Mullin, U.S. Pat. No. 2,939,636, teaches a device which provides a spraying means adapted for converting a liquid material into a fine spray or mist and for forcibly directing such spray downwardly against a well defined area of ground being traversed with the spray being applied to the ground in substantially uniform quantity throughout such area.

Yaremchuk, U.S. Pat. No. 2,973,615, teaches a device which combines a liquid weed-eradicating device with a power driven rotary lawn mower for better distribution of the liquid by the mower blade over the area covered by the machine in its movements such that the liquid is vaporized to a great extent for effective application to the weeds under the mower.

Quick, U.S. Pat. No. 3,462,927, teaches a device controlled by the operator of a cane harvesting machine for causing the severed tops of cane stalks to be discharged either to the right or to the left of the harvesting machine. A pair of guide bars is located in the throat formed by the gathering drums and adjustably mounted so that the severed cane tops will be directed into the influence of one selected gathering drum and thus discharged on a selected side of the machine.

Makeham, U.S. Pat. No. 3,596,447, teaches a harvesting machine particularly for cutting the tops off a standing crop, the cutting apparatus including a pair of knife discs rotatable on substantially vertical axes and having a slight overlap in cutting areas. A pivoted vertically extending guide vane directs cut material toward one knife or the other. A drum is carried above each knife and rotates therewith. The drum has radially extending crop moving paddles thereon. Curved vertically extending guide plates are located to the rear of the drum and intersect at the pivot axis of the guide vane. The knives and drum are individually driven and means are provided to move the guide vane.

Willett, U.S. Pat. No. 3,760,569, teaches a cane topping device for simultaneously topping two rows of cane being cut by a V-cutter harvester wherein overlapping cutters are raised and lowered to compensate for varying cane stalk height and the angle of attack of the cutting blades of the topper may be varied.

Vicendese, U.S. Pat. No. 3,942,308, teaches a combination power driven lawn mower and lawn care chemical dispensing machine in which a hopper for dry granular chemicals is affixed to the top of the lawn mower frame in such a manner that the chemical may be dispensed over an area defined by the swath of lawn cut by the blade.

Otten, U.S. Pat. No. 5,131,216, teaches a device for separating the shoot tips of sugar-cane plants for multi-row sugar-cane harvesting machines. The device includes feed-and-cutting elements mounted in front of a trough-like table having a cross-conveyor worm which receives the tip portions and conveys them to the side. The feed-and-cutting-elements have two feed discs equipped with prongs which interact respectively with a respective cutting disc.

SUMMARY OF THE INVENTION

The invention provides a method and apparatus for simultaneous topping of tobacco plants while applying sufficient growth-regulator chemical(s) for adequate sucker control. The invention is a non-spray system that may use systemic growth retarding compounds. A rotating or reciprocating blade is continuously moistened with retarding agents. While cutting the plant, the invented system simultaneously delivers enough chemical to kill or prevent the growth of auxiliary buds into suckers and prevents future growth after topping.

The invention further provides a method and apparatus for simultaneously topping tobacco and controlling suckers that results in a savings to the grower since less chemical and fewer trips over the field are needed.

The invention further provides a method and apparatus for simultaneously topping tobacco and controlling suckers that accommodates accurate application of chemicals that are applied directly to the cut stem.

The invention further provides a method and apparatus for simultaneously topping tobacco and controlling suckers that eliminates off-target pesticide drift.

The invention further provides a method and apparatus for simultaneously topping tobacco and controlling suckers that reduces worker exposure to chemicals.

The invention further provides a method and apparatus for simultaneously topping tobacco and controlling suckers that eliminates maleic hydrazide residues in cured tobacco leaves. The low tolerance of residues imposed by domestic and foreign buyers, which in turn is due to major competitors for American style tobacco that do not use maleic hydrazide for sucker control, currently threatens the United States tobacco industry. Publication 1997 Flu-cured Tobacco Information published North Carolina Cooperative Extension Service Bulletin AG-187 (1996) is incorporated herewith by reference and contains information useful to the reader concerning this question.

The invention further provides a method and apparatus for simultaneously topping tobacco and controlling suckers that eliminates failures of sucker control with maleic hydrazide due to rain wash off or drought conditions.

The invention further provides a method and apparatus for simultaneously topping tobacco and controlling suckers that may be mounted on or adapted to currently available high-clearance equipment used in tobacco fields for mechanically topping tobacco plants.

OBJECTS OF THE INVENTION

The principal object of the present invention is to provide means for producing "safer" tobacco than is now produced.

Another is to provide a method for reducing maleic hydrazide residue in harvested tobacco leaves.

Another object of the invention is to provide a process that eliminates existing maleic hydrazide spraying.

A further object of this invention is to provide an elimination of the exposure of chemicals to tobacco workers.

BRIEF DESCRIPTION OF THE DRAWINGS

The foregoing and other objects will become more readily apparent by referring to the following detailed description and the appended drawings in which.

DETAILED DESCRIPTION

Figure 1:
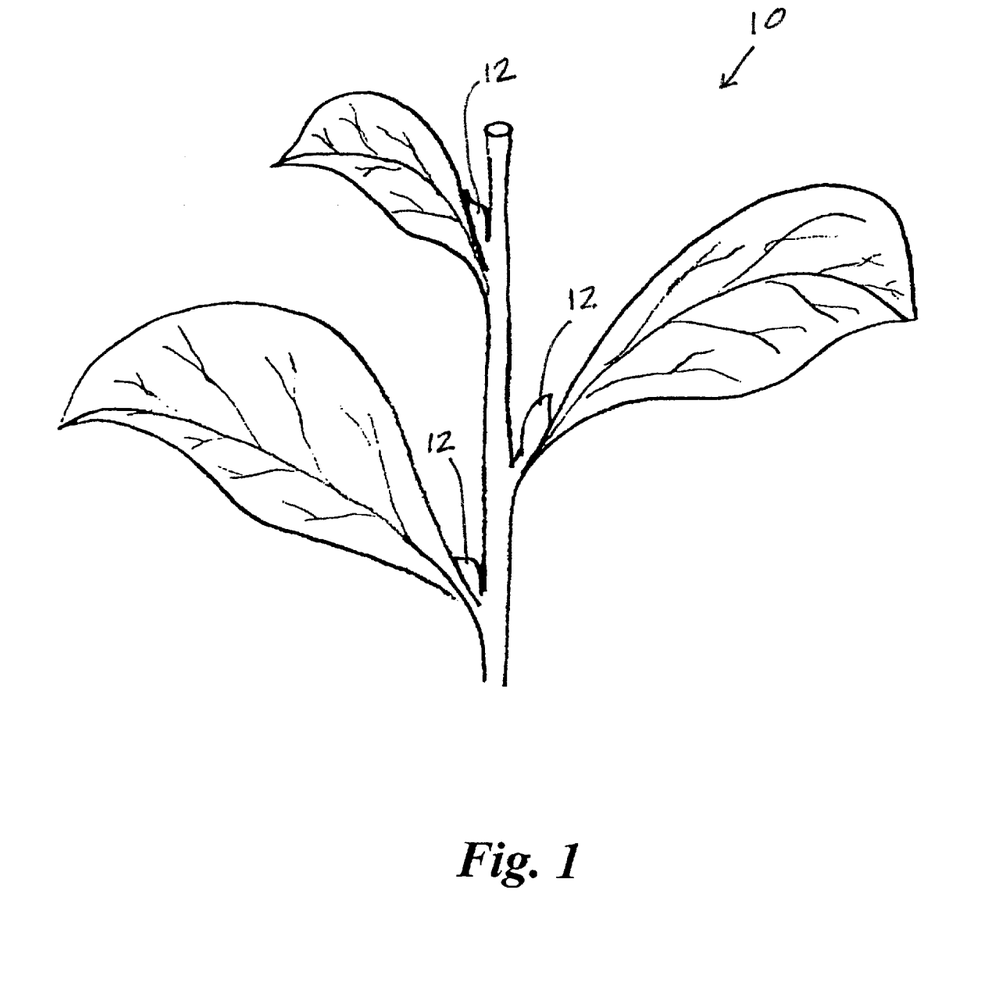
FIG. 1 is an isometric view of a tobacco plant after flower cropping showing suckers.
Figure 2:
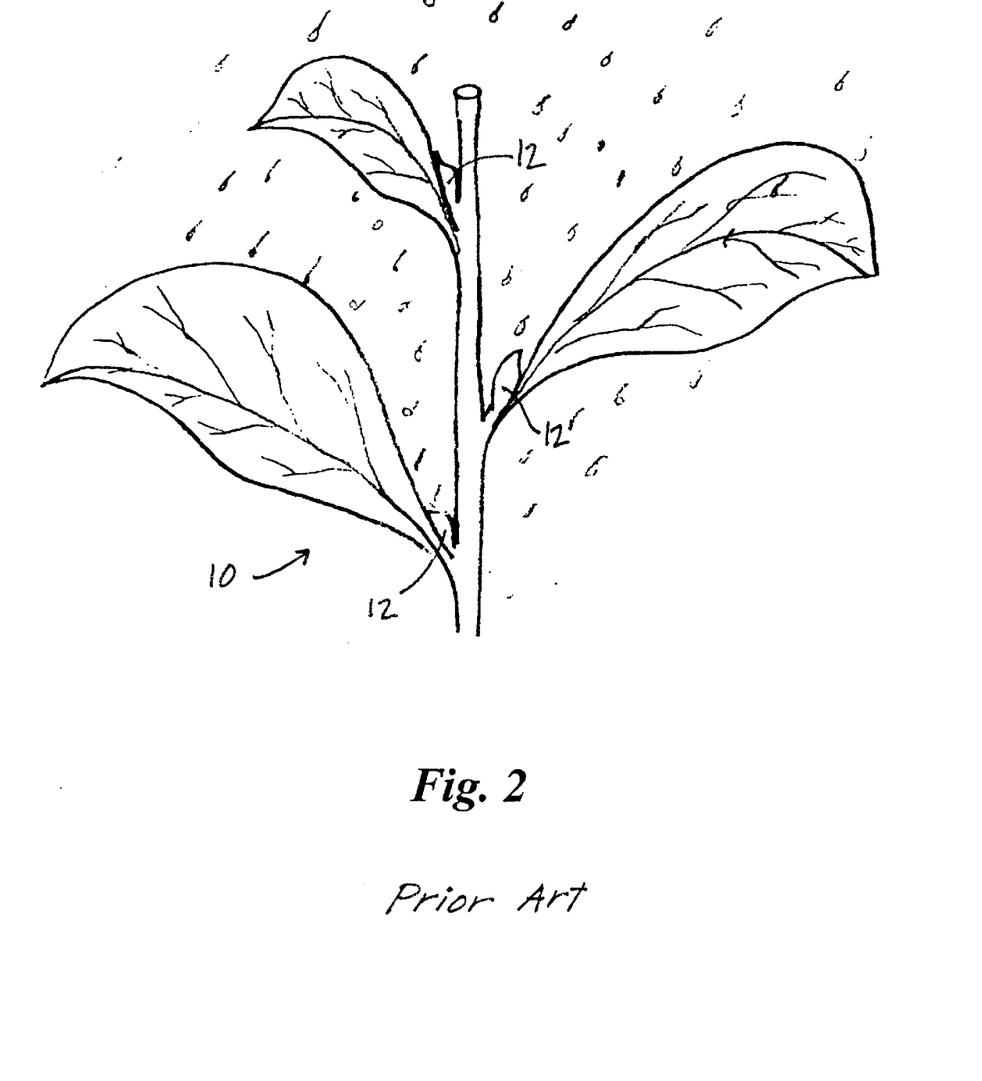
FIG. 2 is an isometric view of a known spraying application of plant growth control chemical.
Figure 3:
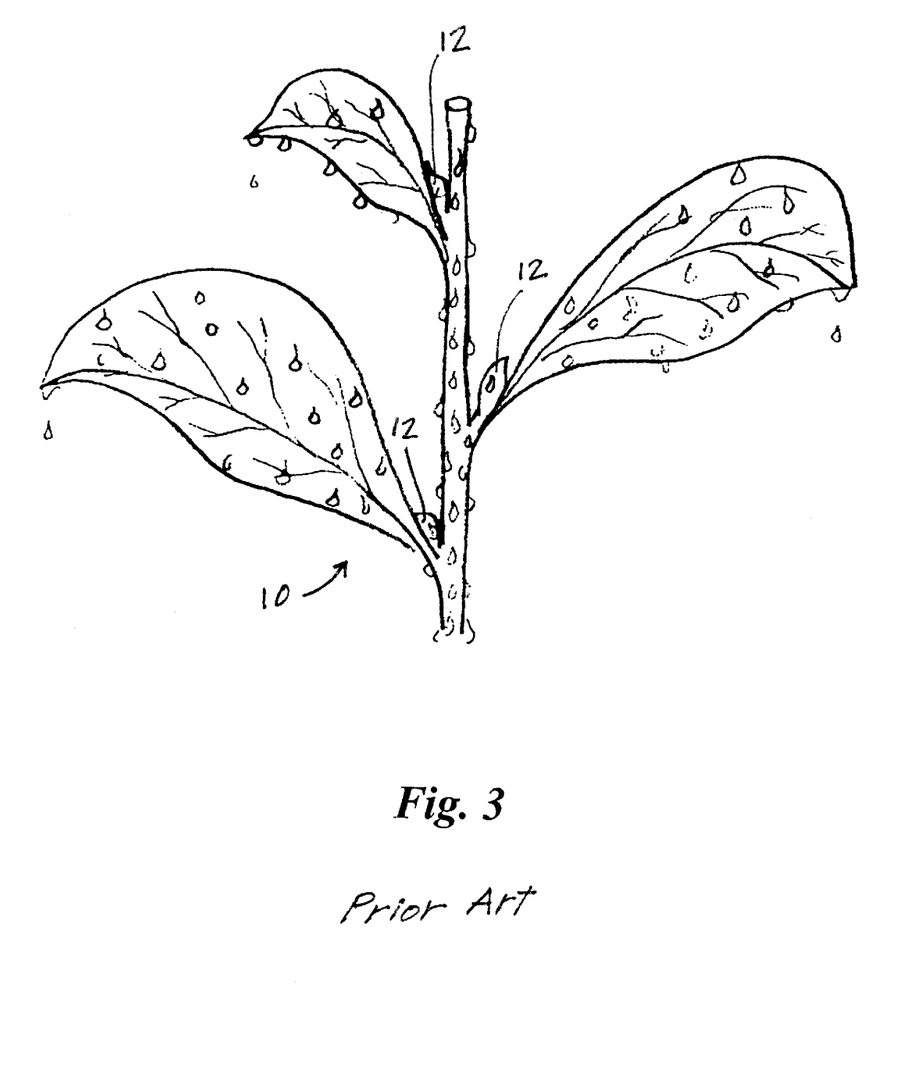
FIG. 3 is an isometric view of a known dripping application of chemicals over the plant immediately after spraying.
Figure 4:
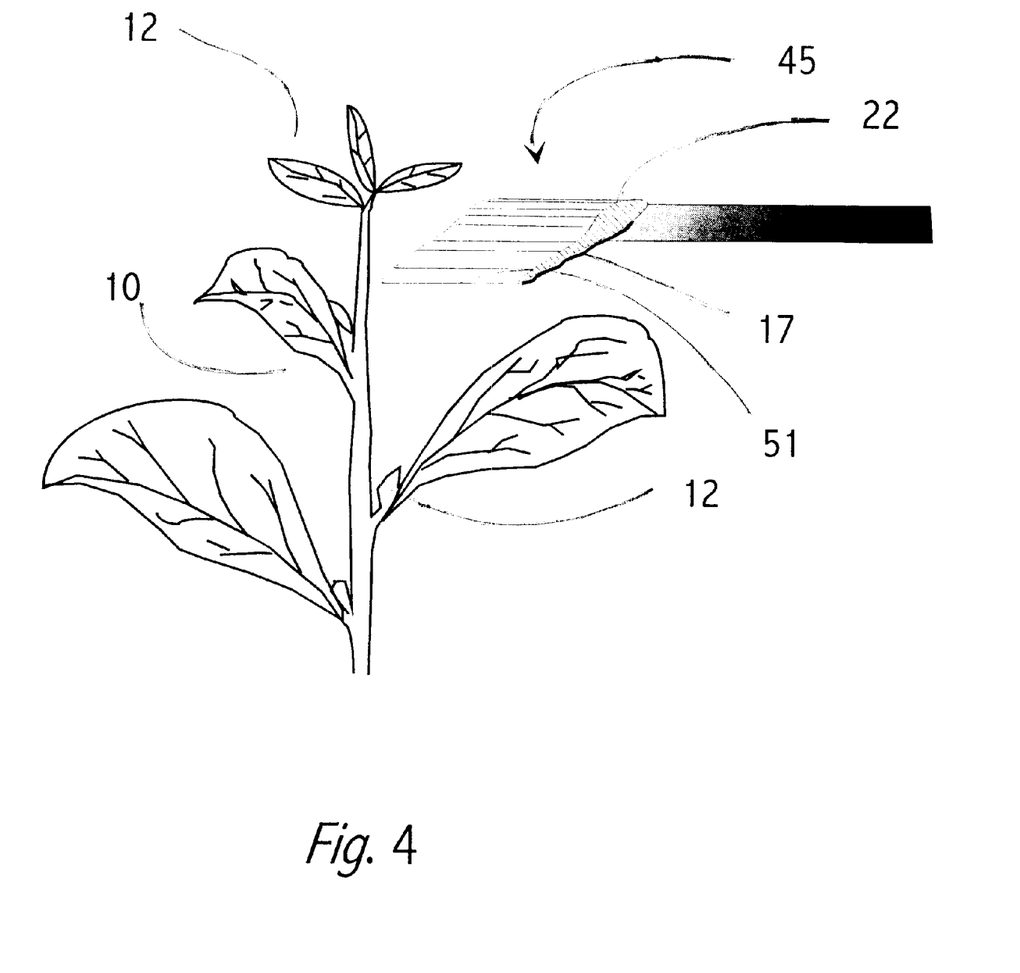
FIG. 4 is an isometric view of the blade with chemicals being held onto the underside of the blade in accordance with the present invention.
Figure 5:
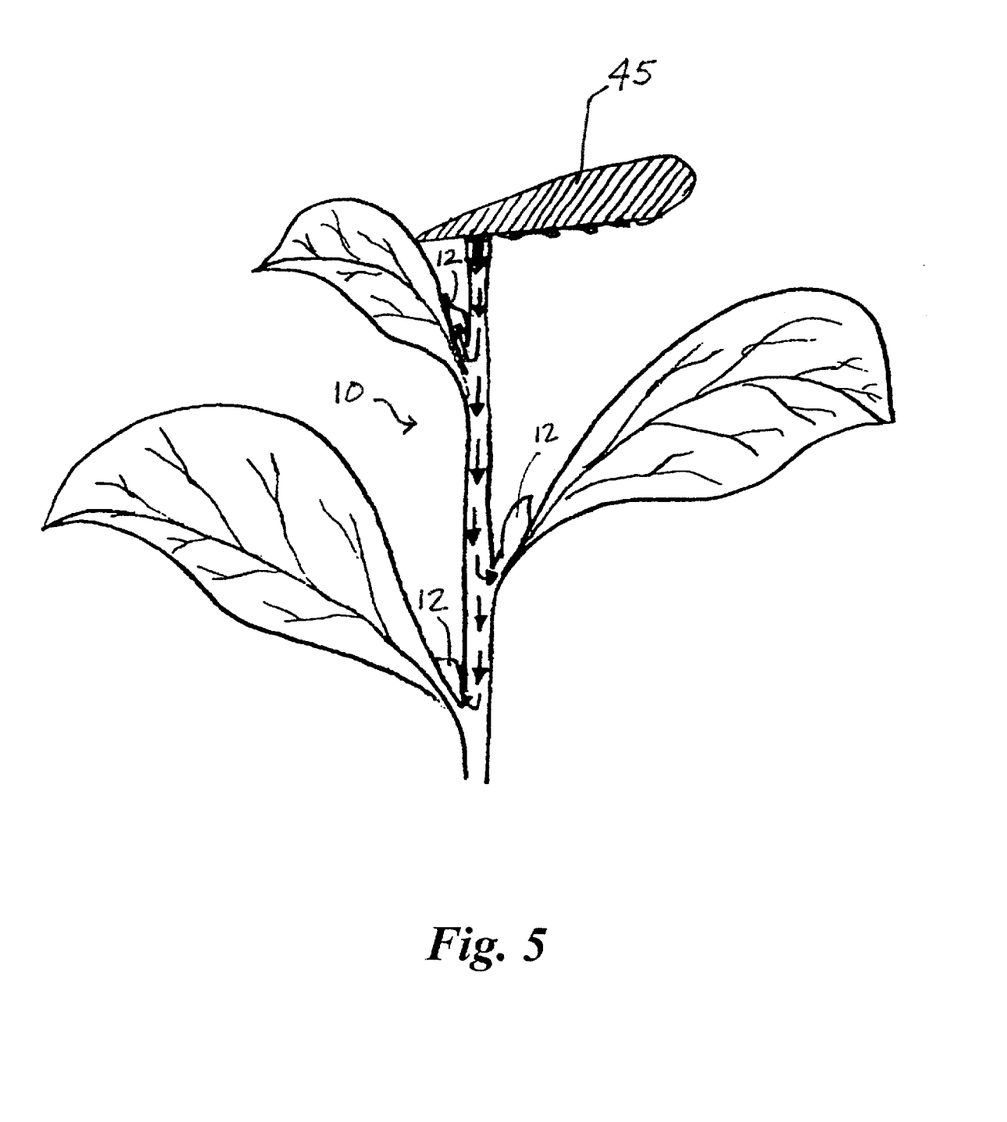
FIG. 5 is an isometric view of the blade applying chemicals directly into the stem of the plant in accordance with the present invention.

Referring now to the drawings, and particularly to FIG. 1, the prior art method is illustrated by FIGS. 1, 2, and 3. FIGS. 4 and 5 are representative of the present invention. FIG. 1 is an isometric view of a tobacco plant shown generally at 10, after flower cropping showing suckers 12. FIG. 2 is an isometric view of the tobacco plant 10 shown in FIG. 1 showing a known spraying application of plant growth control chemical to the plant 10. FIG. 3 is an isometric view of the tobacco plant 10 shown in FIGS. 1 and 2 showing a known dripping application of plant growth control chemical over the plant 10 immediately after spraying.

It should be noted that presently the most effective active ingredient in the market for plant growth regulation is Prime+® which is produced by Novartis Corp. The present invention incorporates Prime+® as the active ingredient. However, the present invention is not intended to be limited to incorporating Prime+200 and may incorporate Royal MH-30®, Stronghold™, Garlon 3A™, Accord™ or any other active ingredient. Regardless of the particular active ingredient, the present invention eliminates repeated passes over tobacco fields for topping and sucker control, and uses less than 1% of the active ingredient used in the known method because the active ingredients applied directly into, not onto, the tobacco plant by the present invention.

The term "flumetralin" is the common name for the active ingredient in the commercial product Prime+® and is a plant growth regulator for control of tobacco suckers. The average reduction in suckers per plant at harvest is sixty two and five tenths percent (62.5%) and the average reduction in weight of suckers per plant is eighty one and eight tenths percent (81.8%). Those skilled in the art of tobacco sucker control will appreciate such average reductions as acceptable sucker control.

The present invention provides for the translocation of Prime+200 downward inside the stalk of the tobacco plant after which the plant growth regulator migrates into the suckers to control their growth. As illustrated in FIGS. 1, 2, and 3, known systems incorporate a higher rate of Prime+® in the spray volume which leads to an excess of the chemical that runs down the outside of the stalk, contacting suckers directly to control them.

In tobacco sucker control, one of two complex procedural programs are commonly used. In Program I, two to three applications of a fatty acid alcohol "contact" sucker chemical are used followed by: 1) MH-30; 2) a mixture of MH-30 and Prime+®; 3) a mixture of MH-30 and contact alcohol; or, 4) a procedure of first applying Prime+® then MH-30. Additional treatments are not required later in the season when weather or geographical conditions do not permit continued sucker regrowth. In Program II, one either applies Prime+® by hand over the top of each tobacco plant or one first applies a contact solution to the plant followed immediately by Prime+®.

The present invention eliminates all the aforementioned complicated, expensive treatments set forth in the aforementioned Program I and Program II. The present invention allows tobacco growers to extract the tobacco flower and eliminate suckering in one pass over the tobacco field using a mechanical tobacco topper that is preferably fitted with a BURCH WET BLADE® system. Here the BURCH WET BLADES applies Prime+® as the effective chemical. Known tobacco sucker control systems inherently require a substantially larger volume of Prime+® because, as previously mentioned above, the known systems require that the effective chemical physically run down the entire length of the tobacco plant, thereby contacting each sucker. In known applications, maleic hydrazide is sprayed over the top of each row of tobacco. Once the leaves are wetted, the chemical is translocated throughout the plant, thereby killing suckers. This translocation is also the cause of unwanted maleic hydrazide residues in cured tobacco unless applied very carefully and properly.

The present invention is preferably mounted on or adapted to currently available high-clearance equipment used in tobacco fields for mechanically topping tobacco plants. In a preferred embodiment, the present invention uses a BURCH WET BLADE® that is described in Patent Cooperation Treaty International Publication No. WO 97/06664; International Publication Date Feb. 27, 1997, and entitled "APPARATUS AND METHOD FOR CUTTING AND TREATING VEGETATION" which is incorporated by reference herein. The present invention, incorporating the BURCH WET BLADE®, causes Prime+®, which is not normally translocated, to move down the stalk and kill all suckers as shown in FIGS. 4 and 5.

Figure 6:
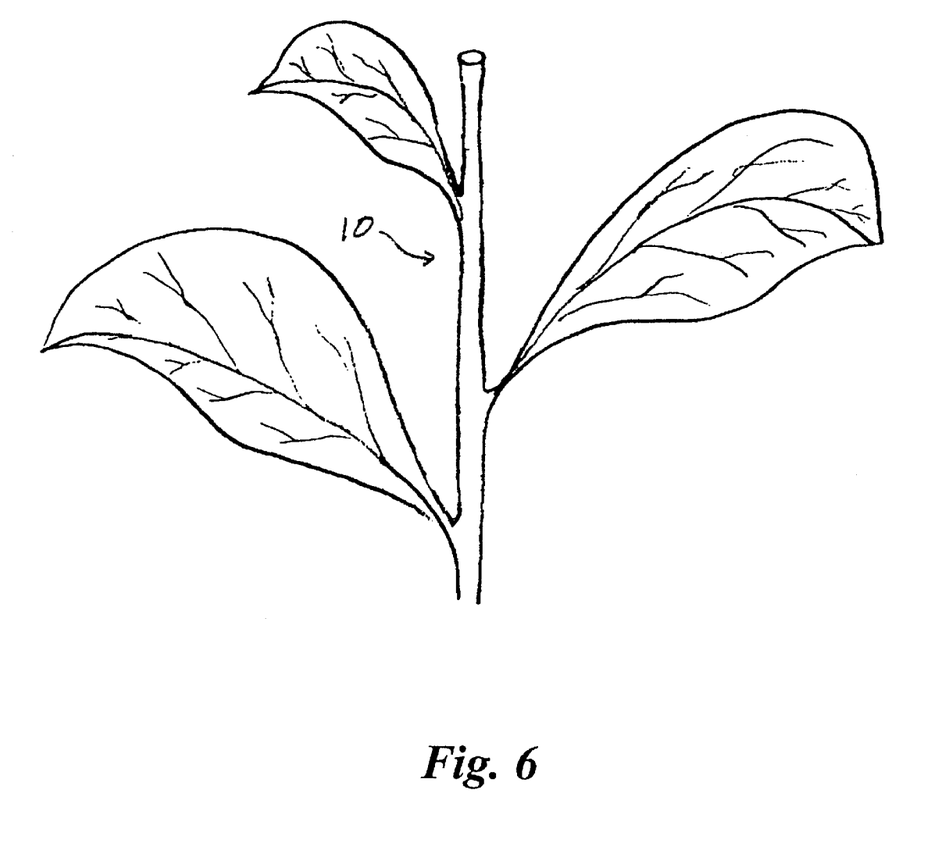
FIG. 6 is an isometric view of the resultant tobacco plant with no suckers.

FIG. 4 is an isometric view of a blade 45 for cropping off the upper section of a tobacco plant, described further hereinafter, with chemicals 17 being held onto the underside of the blade 45 in accordance with the present invention. FIG. 5 is an isometric view of the aforementioned blade 45 when applying chemicals directly into the stalk 9 of the plant 10 in accordance with the present invention. The blade 45 being comprised of a cutting edge 18, a blade wing 22 which is an air lift and a fluidly communicating means. As shown in FIG. 4 the blade 45 is rotating toward the tobacco plant 10, where said plant has an outgrowth of suckers 12. The plant growth control chemicals 17 translocate down the stalk 9 when the chemicals 17 are applied in accordance with the present invention. In using the present invention, many applications and multiple toppings are eliminated along with undesirable maleic hydrazide residues in the cured tobacco leaves. FIG. 6 is an isometric view of the resultant tobacco plant 10 having no suckers because of the effective application of plant growth control chemicals using the present invention.

Figure 8:
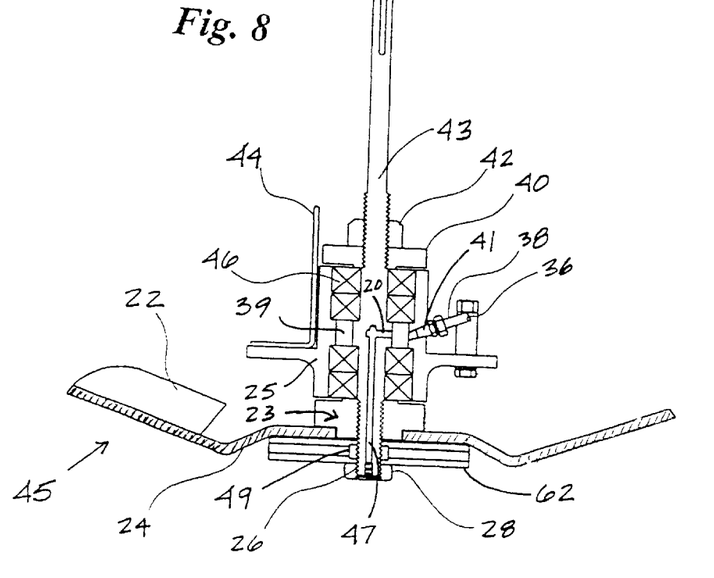
FIG. 8 is a cross sectional view of a blade assembly for a tobacco topper in accordance with the present invention.

FIG. S is a cross sectional view of a blade assembly for a tobacco topper in accordance with the present invention in one embodiment, the invented apparatus for simultaneously cutting and directing fluid into the stem of a tobacco plant comprises a blade assembly having at least one fluid bearing blade, shown generally at 45, means for supplying fluid to the underside of each of the blades 45, means for rotating the fluid bearing blades 45 at a high speed, and means for transporting said blade rotating means from one tobacco plant to another. The invented apparatus may further comprise a drive shaft 43 having a blade receiving end, shown generally at 23, a housing 25 and a magazine mounting assembly. The blade assembly comprises a WETBAR fluid distributor 62 that is removably coupled to the blade receiving end 23 of the shaft 43. The other end of the shaft 43 is coupled to the rotating means The blades 45 are attached to the WETBAR fluid distributor 62 and extend radially away from the drive shaft 43. The blade 45 has means for delivering a plant growth control chemical to the topped surface of the tobacco plant.

The shaft 43 comprises an axial fluid conduit 47 formed partially therein that has an inlet and an outlet, an input radial conduit 20 that is in fluid communication with the inlet of the axial conduit 47 and a fluid manifold 58 fluidly communicating to one or more of an output radial conduits 60 (FIG. 10), where all are in fluid communication with the outlet of the axial conduit 47. The housing 25 is positioned adjacent the blade assembly mid coupled to the shaft 43 and comprises a bearing mechanism 46 that is coupled to said shaft 43, an annular well 39 that is in fluid communication with the input radial conduit 20, and a fluid tight fitting 41 formed in the housing 25 and extending from the annular well 39 to the exterior of said housing 25.

The blade assembly is preferably coupled to the shaft 43 using a WETBAR fluid distributor jam nut 28 for securing the WETBAR fluid distributor 62 to the shaft 43. A bottom bearing keeper 23 is coupled to the shaft 43 and interposed between the housing 25 and the blade assembly. A lock nut 42 secures the housing 25 and the blade assembly to the shaft 43. A top bearing keeper 40 is coupled to the shaft 43 and interposed between the lock nut 42 and the housing 25.

Figure 9:
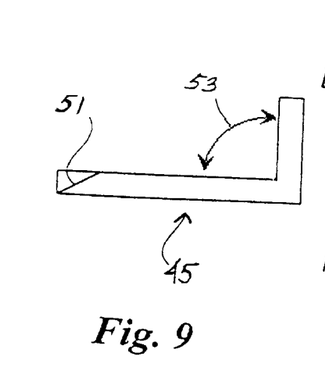
FIG. 9 is a cross sectional view of a blade showing the cutting edge in accordance with the present invention.
Figure 10:
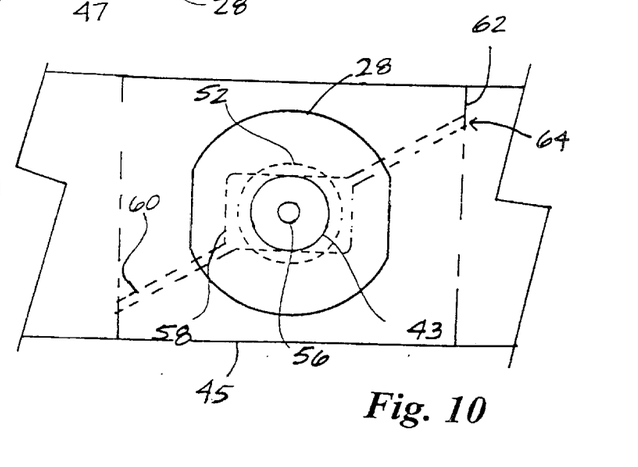
FIG. 10 is a cross sectional view of a portion of the blade assembly in accordance with the present invention.

FIG. 9 is a cross sectional view of the blade 45 showing the cutting edge 51 in accordance with the present invention. Each blade includes a blade wing 22 and the cutting edge 51. The blade wing is set to a pre-determined blade wing angle 53. FIG. 10 is a cross sectional view of a portion of the blade assembly in accordance with the present invention. The WETBAR fluid distributor 62 comprises the previously mentioned centrally disposed fluid orifice 56 that is in fluid communication with the axial conduit 47 of said shaft 43, and at least one orifice 64 extending generally radially away from the centrally disposed fluid orifice 56 and in fluid communication with the centrally disposed fluid conduit 56.

Plant growth control chemical is provided via a fluid inlet 36 and through associated tubing 38. The chemical is then received in the housing 25 by the fluid fitting 41 and accumulates in the well 39. During operation of the invented apparatus, chemical is drawn into the inlet radial conduit 20 from the well 39 and travels down the axial conduit 47 to the blade assembly. The chemical then travels out of he axial conduit 47, into the fluid conduit 58 of the WETBAR fluid distributor 62 and into the radial conduits 60. The chemical then accumulates on a blade contact surface 24.

Figure 11:
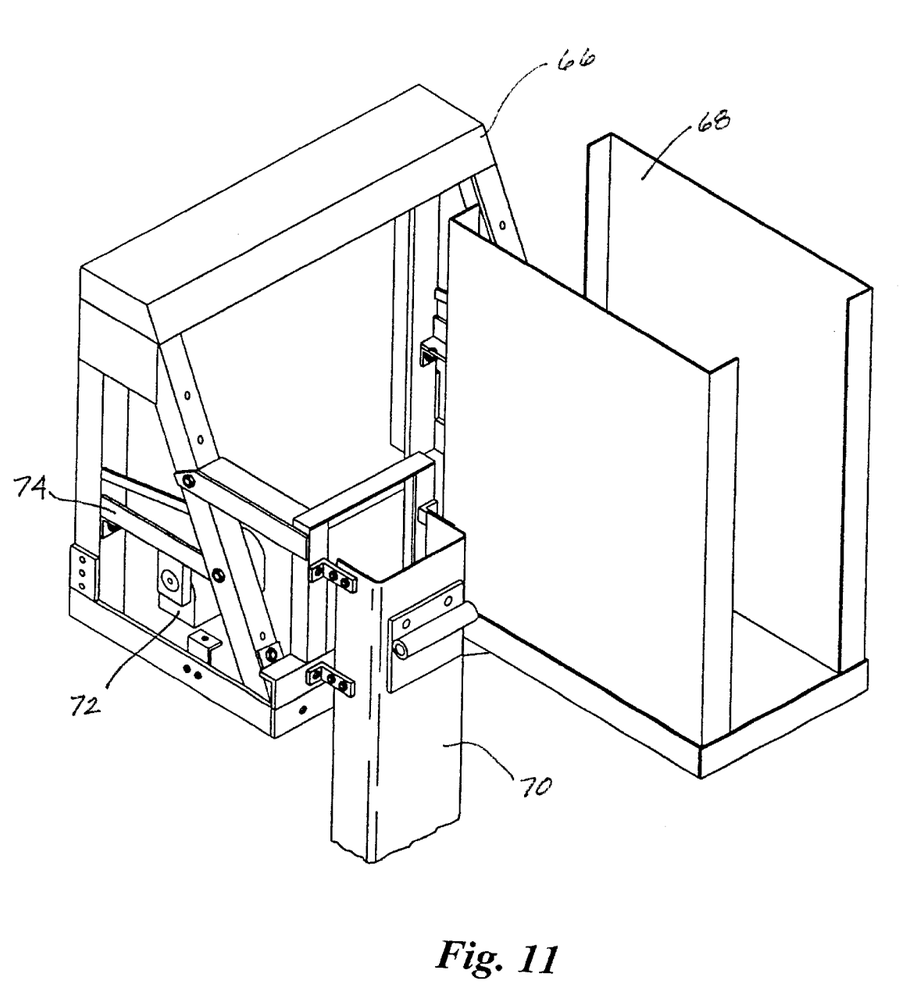
FIG. 11 is an isometric view of a portion of the tobacco topper structure in accordance with the present invention.

FIG. 11 is an isometric view of a portion of the tobacco topper structure in accordance with the present invention. The tobacco topper structure includes a magazine mounting frame 66 for coupling to the tobacco topper support frame for containing the plant growth control chemical, a chemical container magazine 68 fixedly attached to the magazine mounting frame 66, a pump drive mounting frame 70 fixedly attached to the magazine mounting frame 66, a metering pump bracket 74 and a metering pump 72 attached to the metering pump bracket.

EXAMPLE

Field Test Result

A simulation was conducted using hand clippers which simulate the action of the BURCH WET BLADE®, successful tobacco sucker control results were recorded with three rates of flumetralin (Prime+®) sucker control chemical.

Approximately ½ gal. of solution was used per acre. Thus, in the 50% solution, approximately 0.3 pounds of active ingredient per acre was used. In contrast and for comparison, one gallon of Prime+® is the recommended rate per acre when spraying which would provide approximately 1.2 pounds of active ingredient per acre.

The 75% solution provides approximately 0.45 pounds of active ingredient per acre and the full strength rate provides approximately 0.6 pounds of active ingredient per acre. This illustrates that using the invented method and apparatus, at least a 50% reduction in the current labeled rate is available.

The following illustrates the results of the field test using Prime+® and Royal MH-30 ®. In a field test using the present invention, the three rates of flumetralin (Prime+®) were:

a. a 50% solution of the commercial product (diluted to 50% with water);

b. a 75% solution of the commercial product; and c. a solution of the commercial product at full strength (undiluted).

| Treatment | Rate* | No. Suckers per plant | | | | | Grams of Suckers per plant | | | | |
|---|---|---|---|---|---|---|---|---|---|---|---|
| | | Replication No. | | | | | Replication No. | | | | |
| | | I | II | III | IV | Average | I | II | III | IV | Average |
| MH-30 | 25% | 9.5 | 7.9 | 8.9 | 8.8 | 8.8 | 80.3 | 102.4 | 122.1 | 84.9 | 97.4 |
| MH-30 | 50% | 7.3 | 8.7 | 10.1 | 8.9 | 8.8 | 55.0 | 91.0 | 87.1 | 130.0 | 90.8 |
| MH-30 | 75% | 8.5 | 8.6 | 8.1 | 9.2 | 8.6 | 68.2 | 117.0 | 87.9 | 126.0 | 99.8 |
| MH-30 | 100% | 8.6 | 8.1 | 7.8 | 8.1 | 8.2 | 63.7 | 95.0 | 96.6 | 103.9 | 89.8 |
| Prime+ | 50% | 5.6 | 2.8 | 3.1 | 3.5 | 3.8 | 20.5 | 9.7 | 16.9 | 11.3 | 14.6 |
| Prime+ | 75% | 5.6 | 1.6 | 3.1 | 1.8 | 3.0 | 10.3 | 5.1 | 51.9 | 13.1 | 20.1 |
| Prime+ | 100% | 6.3 | 3.7 | 1.5 | 3.1 | 3.7 | 32.0 | 53.0 | 10.2 | 32.9 | 32.0 |
| Control (water) | | 12.1 | 9.2 | 7.3 | 6.5 | 8.8 | 99.5 | 93.7 | 157.9 | 135.5 | 121.7 |

*Rate refers to % concentration of commercial product
**Values per replication are an average of 10 plants sampled per replication. There were 25 plants total per replication.

For all four rates of MH-30 treatments, there was an average of 3.5% % reduction in the number of suckers per tobacco plant at harvest and an average reduction of 22.4% weight (grams) of suckers per plant. Surprisingly, this demonstrates that using MH-30 would not be commercially acceptable.

For all three rates of Prime+® (averaged together), there was a 62.5% reduction in the number of suckers per plant and an 81.8% reduction in weight of suckers per plant. These values are derived from comparing the number of suckers per plant and weight of sucker per plant to the water control used when topping.

From these results, none of the MH-30 rates gave acceptable sucker control. In contrast, all of the Prime+® rates gave acceptable sucker control. MH-30 was expected to be highly effective in the sucker control test because MH-30 is easily translocated in the tobacco plant when sprayed over-top and onto the leaves. On the other hand, Prime+® was not expected to be effective since it is classed as a "control-local-systemic" type of growth regulator. That is, Prime+® is not moved into sucker buds by application to leaves as MH-30 is applied. The Prime+® solution must first wet the suckers directly.

SUCKER CONTROL TEST, BURLEY TOBACCO
USING HAND CLIPPERS TO SIMULATE BURCH WET BLADE ®

| TREATMENT | RATE | GMS/PLANT (SUCKERS)* | NO./PLANT (SUCKERS)* | GMS./SUCKER | % CONTROL | CROP INJURY RATING |
|---|---|---|---|---|---|---|
| Stronghold | 10% | 438 | 9.6 | 45.6 | 0 | 0.5 |
| Stronghold | 50% | 71 | 4.4 | 16.1 | 81.3 | 2.0 |
| Transline | 1% | 316 | 9.6 | 32.9 | 16.6 | 0.3 |
| Transline | 10% | 375 | 10.5 | 35.7 | 1.1 | 0.0 |
| 2,4-D Amine | 1% | 406 | 10.0 | 40.6 | 0 | 0.0 |
| 2,4-D Amine | 10% | 161 | 5.9 | 27.3 | 27.3 | 0.5 |
| Garlon 3A | 1% | 261 | 9.3 | 28.1 | 31.1 | 0.6 |
| Garlon 3A | 10% | 146 | 5.7 | 25.6 | 61.5 | 0.0 |
| Accord | 0.5% | — | 11.2 | — | — | 0.5 |
| Accord | 1% | 238 | 8.2 | 29.0 | 37.2 | 0.5 |
| Accord | 5% | 44 | 5.1 | 8.6 | 88.4 | 0.5 |
| Accord | 10% | 34 | 4.5 | 7.6 | 91.0 | 1.5 |
| Accord | 50% | — | — | — | — | 4.0 |
| Accord | 100% | — | — | — | — | 5.0 |
| BAS 125 | 1.6 oz | 515 | 10.7 | 48.1 | 0 | 0.2 |
| BAS 125 | 4.3 oz | 445 | 10.7 | 41.6 | 0 | 0.6 |
| Check | — | 379 | 10.0 | 37.9 | 0 | 0.0 |

*Average for 5 plants/plot, 4 plots per replication
**Rating based on 0 = no injury, 5 = dead tobacco plants.
Injury rating was based on necrosis of upper leaves.
Treatments applied using 0.5 gallons water per acre.

From the results shown above, six plant growth control chemicals were tested. Of these six chemicals, three, namely Stronghold™, Garlon 3A™, and Accord™, showed favorable results. A 50% solution of Stronghold™ provided an approximately 81% reduction in the number of suckers with slight crop damage. A 10% solution of Garlon 3A™ provided an approximately 61% reduction in the number of suckers with no injury. A 10% solution of Accord™ gave an approximately 91% reduction in the number of suckers with slight crop injury. Stronghold™ is a growth retardant for broad leafplants, Garlon 3A™ is a herbicide, and Accord™ is a formulation of Roundup™ herbicide without a surfactant added. These results indicate that the application of the present invention is effective at controlling sucker growth and more effective than conventional methods of applying plant growth control chemicals to tobacco plants.

Alternative Embodiments

Figure 7:
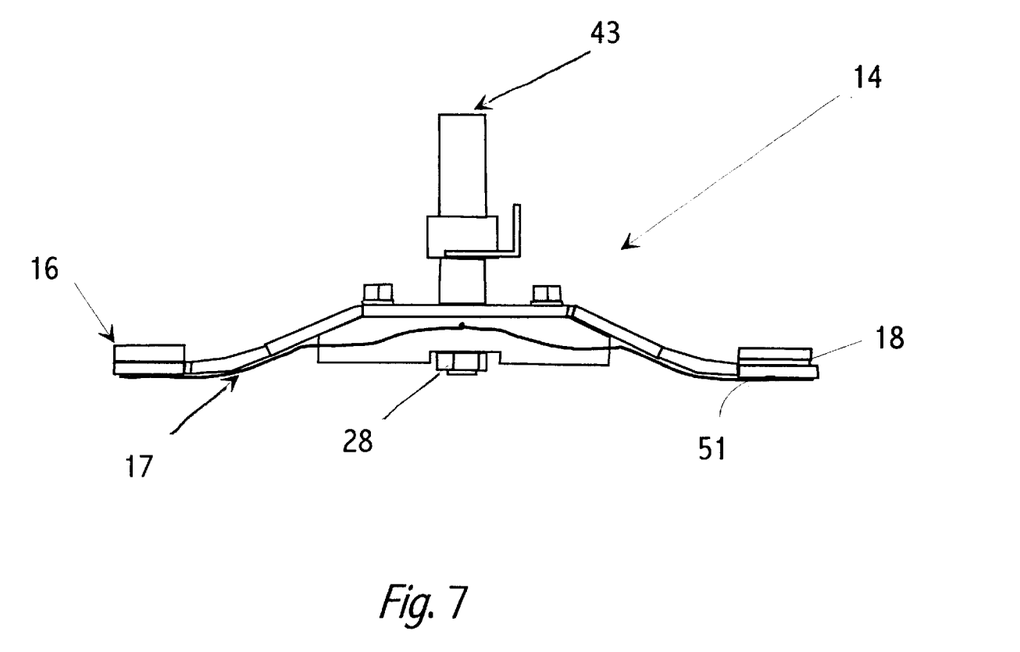
FIG. 7 is an isometric end view of an alternative embodiment of the blade seen in FIGS. 4 and 5.

An alternative embodiment of the blade 45 that is shown in FIGS. 4 and 5, may be seen in FIG. 7. The wedged blade 14 shown in FIG. 7 being comprised of a cutting edge 18, a blade wing 22, said blade wing being is an air lift, and a fluidly communication means and a wedge 18, when in use, has solution of chemical 17 disposed on the bottom surface of the blade 14 for topping tobacco plants. The wedge 18 disposed on the top surface of the wedged blade 14 assists the air lift in clearing away the severed portions of the tobacco plant. The airlift 16 is also disposed on the top surface of the blade shown in FIG. 7. As discussed in the International Application WO 97/06664, the airlift facilitates the retention of solution of chemical 17 on the bottom surface of the wedged blade 14 shown in FIG. 7.

SUMMARY OF THE ACHIEVEMENT OF THE OBJECTS OF THE INVENTION

From the foregoing, it is readily apparent that I have invented an improved non-spray system which has shown superior qualities in applying systemic growth regulators (growth retarding) compounds. In this system, a rotating or reciprocating blade is continuously moistened with plant growth control chemical and cuts plants. The invented system simultaneously delivers enough plant growth control chemical to kill and prevent the growth of auxiliary buds, or suckers, and prevents future growth of the same after topping. The present invention simultaneously tops the tobacco plants and applies sufficient growth-regulator chemicals for adequate sucker control.

Advantages of the present invention include: (1) substantial time and financial savings to the grower since less chemical and fewer passes over the tobacco field would be needed; (2) accurate application of the plant growth control chemical directly to the cut stem; (3) eliminating off-target pesticide drift; (4) reducing worker exposure to chemicals; and (5) eliminating maleic hydrazide residues in cured tobacco leaf which currently is threatening the United States tobacco industry. The present invention also reduces failures of sucker control with maleic hydrazide due to rain wash off or drought conditions.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. An apparatus for simultaneously topping a tobacco plant and controlling sucker growth thereon by directing the chemical fluid into a stalk of the tobacco plant, where said apparatus is adapted to a tobacco topper, said tobacco topper providing a magazine of a chemical fluid and an associated metering pump, said apparatus comprising:

a blade assembly having a blade and a shaft;
a means for supplying fluid to an underside of said blade;
a means for rotating said blade at a high speed; and
a means for conveying the apparatus from one plant to another;

said blade comprising a cutting edge, an air lift and a fluidly communicating means;

wherein said blade cuts off an upper section of the stalk leaving an open stalk, deposits the chemical fluid into the open stalk, and lifts away the upper section of the stalk; wherein said chemical translocates downward through the stalk.

2. An apparatus in accordance with claim 1 further comprising:
- a drive shaft having a blade receiving end, said shaft coupled to said rotating means, said shaft comprising:
  - an axial fluid conduit formed partially therein, said axial conduit having an inlet and an outlet;
  - an input radial conduit in fluid communication with said inlet of said axial conduit; and
  - two output radial conduits in fluid communication with said outlet of said axial conduit.

3. An apparatus in accordance with claim 2 wherein said blade additionally has a wedge, wherein said wedge augments the air lift, and lifts away the upper section of the stalk.

4. A apparatus in accordance with claim 3 further comprising:
- a housing positioned adjacent said blade assembly and coupled to said shaft, said housing comprising:
  - a bearing mechanism coupled to said shaft;
  - an annular well in fluid communication with said input radial conduit; and
  - a fluid tight fitting formed in the housing and extending from said annular well to the exterior of said housing.

5. A system in accordance with claim 1 further comprising:
- a magazine mounting frame for containing the plant growth control chemical;
- a chemical container magazine fixedly attached to said magazine mounting frame;
- a pump drive mounting frame fixedly attached to said magazine mounting frame;
- a metering pump bracket; and
- metering pump attached to said metering pump bracket.

6. A system in accordance with claim 4 further comprising:
- a WETBAR fluid distributor jam nut for securing said WETBAR fluid distributor to said shaft;
- a bottom bearing keeper coupled to said shaft and interposed between said housing and said blade assembly;
- a lock nut for securing said housing and said blade assembly to said shaft; and
- a top bearing keeper coupled to said shaft and interposed between said lock nut and said housing.

7. A system in accordance with claim 4 wherein each of said at least one blade includes a blade wing and a cutting edge.

8. A system in accordance with claim 4 wherein said WETBAR fluid distributor comprises:
- a centrally disposed fluid conduit in fluid communication with said axial conduit of said shaft; and
- at least one orifice extending generally radially away from said centrally disposed fluid conduit and in fluid communication with said centrally disposed fluid conduit; said at least one orifice terminating in at least one fluid exit.

* * * * *